(12) United States Patent
Dulac (10) Patent No.: US 6,698,714 B2
(45) Date of Patent: Mar. 2, 2004

(54) FLUID SAFETY DISCHARGE SYSTEM

(76) Inventor: Lawrence M. Dulac, 45 South Rd., Deerfield, NH (US) 03037

( * ) Notice: Subject to any disclaimer, the term of this patent is extended or adjusted under 35 U.S.C. 154(b) by 143 days.

(21) Appl. No.: 09/907,201

(22) Filed: Jul. 17, 2001

(65) Prior Publication Data

US 2003/0015677 A1 Jan. 23, 2003

(51) Int. Cl.[7] .................. F16K 51/00; F16L 29/00
(52) U.S. Cl. ............. 251/148; 285/2; 137/71; 122/504
(58) Field of Search .................. 285/1, 2, 215, 285/216, 219, 341, 137.11, 137.2, 356, 357; 251/148, 150, 151; 222/396; 137/68.23, 71; 122/504, 504.1

(56) References Cited

U.S. PATENT DOCUMENTS

| 1,694,492 | A | * | 12/1928 | Fulton et al. | 236/92 C |
| 3,154,248 | A | * | 10/1964 | Tabler | 236/21 B |
| 3,294,359 | A | * | 12/1966 | Patton | 251/148 |
| 3,923,323 | A | * | 12/1975 | Brogan | 285/3 |
| 3,961,156 | A | * | 6/1976 | Patton | 392/451 |

* cited by examiner

Primary Examiner—Edward K. Look
Assistant Examiner—John K Fristoe, Jr.
(74) Attorney, Agent, or Firm—Bourque & Associates, PA (57) ABSTRACT

A fluid safety discharge system for a relief valve having an inlet and an outlet includes a bushing frictionally engaging the relief valve outlet. The relief valve outlet is internally threaded for engaging with a threaded device, such as a discharge line. The bushing may contain a separate body and engagement region for use with hard-plumbed discharge lines. Optionally, an adapter may be used for retrofitting the bushing to an existing relief valve.

24 Claims, 10 Drawing Sheets

FLUID SAFETY DISCHARGE SYSTEM

TECHNICAL FIELD

The present invention relates to the safe discharge of fluids and more particularly, to a pressure relief valve having a tamperproof outlet.

BACKGROUND INFORMATION

Common residential and commercial water heaters and boilers generally include a pressurized tank or vessel in which the heated water is stored until required for use. The temperature and pressure of the water stored within the tank will typically vary within predetermined limits when the water heater operates normally. However, when a malfunction occurs, the temperature and/or pressure of the water stored within even a common residential water heater are capable of inflicting severe damage. If the tank itself should fail, for example, due to excessive pressure in the water supply, boiling of the water, or age, high temperature water may be spread explosively from the tank over a considerable distance.

To avoid these catastrophic results, common residential and commercial water heaters and boilers always include a relief valve that releases water/steam when temperature and/or pressure of the water within the tank exceeds a predetermined value. The discharge side of the relief valve is generally threaded, allowing for the connection of a discharge pipe that releases the heated water into a reservoir or along the floor where there is less danger of injury to individuals.

While known relief valves are a significant and well-known safety feature of common water heaters and boilers, they often develop slow leaks. Many systems, however, do not utilize reservoirs or drains. As a result, homeowners often permanently plug the outlet of the relief valve to avoid the water from dripping onto the floor. The act of permanently plugging the relief valve is commonplace and has resulted in many injuries and deaths. This is due to the inability of the plugged relief valve to perform as it was intended.

Furthermore when left exposed, the outlet on the relief valve may become blocked by freezing, rust, improper sizing, and foreign materials such as dirt, leaves, etc. The situations described are also applicable to other relief valves such as those found on any pressurize ($CO_2$, $NO_2$, $O_2$, etc.) tanks, boilers, or water/steam vessels.

For the above reasons, it would be desirable to provide a fluid discharge system that would allow reduce the possibility of blockage of the relief valve, while still allowing the relief valve to properly function when the condition in the tank or boiler becomes unsafe. Ideally, such a system should be low in cost and easily installable.

SUMMARY

The present invention is a fluid safety discharge system. The system comprises a relief valve and a bushing. The bushing has a body and internal threads. The bushing engages frictionally with a discharge outlet of the relief valve and allows the bushing to disengage from the relief valve at a predetermined pressure, thereby allowing the relief valve to perform as intended even if the bushing or connected piping is plugged. The system may optionally be coupled to a discharge line.

The bushing may optionally include an adapter portion for use with an existing relief valve. Additionally, the bushing may include a tamper-proof device that further prevents a homeowner from removing it from the relief valve.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
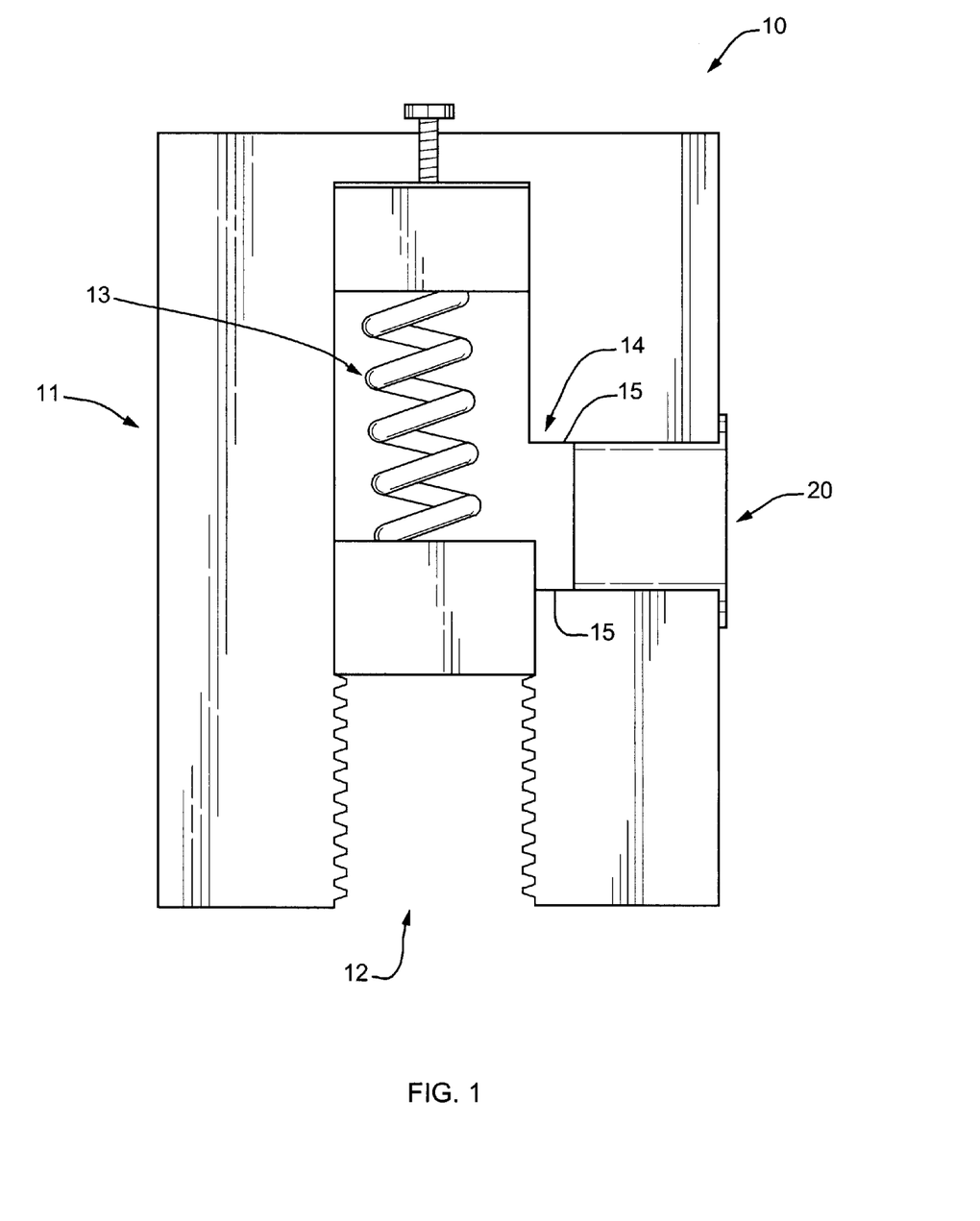
FIG. 1 is a perspective view of one embodiment of the fluid safety discharge system of the present invention.

The fluid safety discharge system 10, FIG. 1, according to the present invention comprises a relief valve body 11 and an internally threaded bushing 20. The relief valve 11 may be any type of relief valve 11 designed for any type of fluid (i.e. liquid or gaseous). The relief valve 11, as is well known in the art, has an inlet 12, an outlet 14, and a control mechanism represented generally at 13. The inlet 12 is connected to the potentially hazardous source, e.g. a hot water heater (not shown). In one embodiment, the outlet 14 has walls 15 that are generally smooth.

Figure 2:
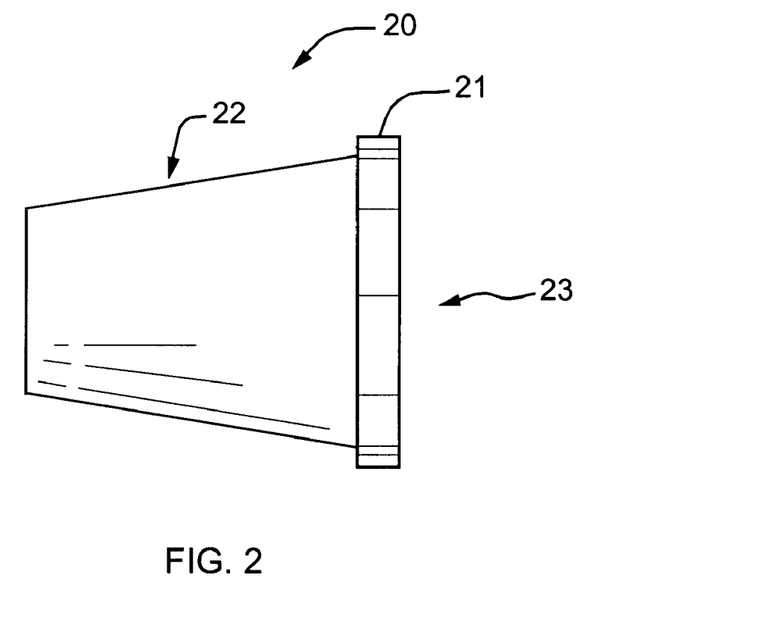
FIG. 2 is a side view of one embodiment of a bushing of the present invention.
Figure 3:
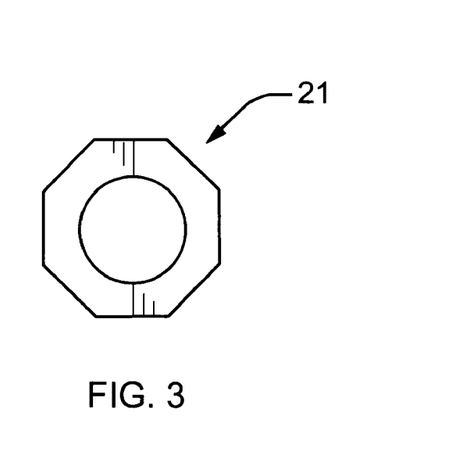
FIG. 3 is an end view of one embodiment of the present invention.

The bushing 20, FIG. 2, has a body portion 22 and a flange portion 23 which also includes a gripping region 21, FIG. 3, such as a several sided flange which can be gripped by a pipe wrench. In a preferred embodiment, the body 22 is slightly tapered. The body 22 is sized so that when the bushing 20 releases from the outlet 14, the remaining area for the hazardous material (e.g. hot water or steam) to exit is equal to, or greater than, the area that is required by state or local regulation.

Figure 4A:
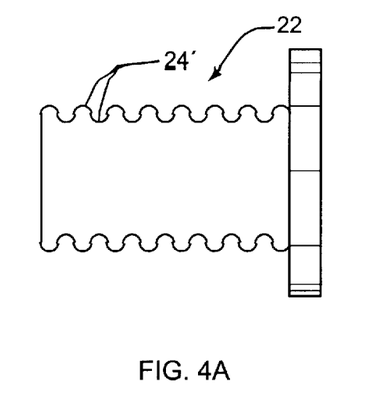
FIG. 4A is a side view of one embodiment of the body of a bushing.
Figure 4B:
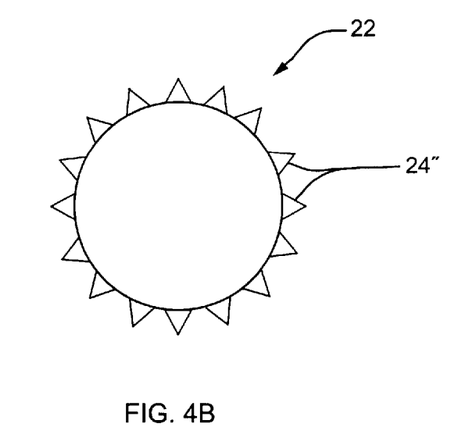
FIG. 4B is an end view of another embodiment of the body of a bushing.

The surface of the body 22 may be smooth, FIG. 2, or have undulating or alternating high and low protrusions 24, FIGS. 4A and 4B. In one embodiment, the protrusions 24', FIG. 4A, are annular. In another embodiment, the protrusions 24", FIG. 4B, are longitudinal.

The protrusions 24 are designed to facilitate a frictional fit with the walls 15 of outlet 14 of the relief valve 11. It should be noted that the bushing 20 need not create a watertight seal. In cold climates, for example, a water tight seal may allow the liquid to back up in the relief valve 11 outlet 14 and eventually freeze, thus blocking the relief valve 11. Therefore, a non-water tight seal may be preferable.

The bushing 20 is typically made of a material having sufficient rigidity to allow the bushing to be secured to the outlet 14 of the relief valve 11, yet flexible enough allow the bushing 20 to disengage the outlet 14 when sufficient pressure has built up. In a preferred embodiment, the material is a synthetic material, such as plastic, but may also be a metal or composite. The rigidity and flexibility of the material will depend upon the application, but is within the knowledge of one of ordinary skill in the art.

Figure 5:
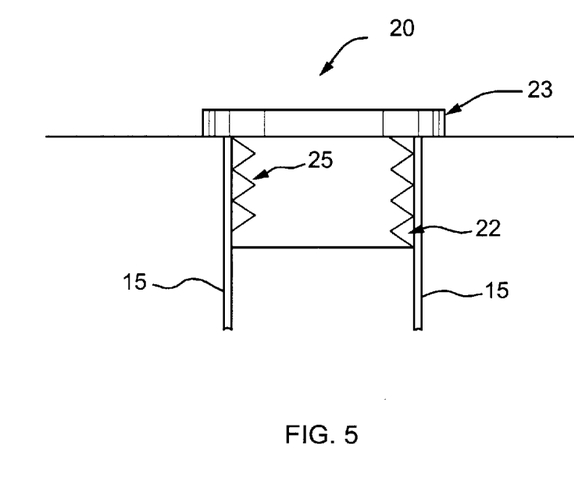
FIG. 5 is a cross sectional view of one embodiment of the present invention.

Additionally, the body 22 includes internal threads 25, FIG. 5, typically IPS pipe threads, for engaging with a discharge pipe or other similar attachment fittings.

Figure 6:
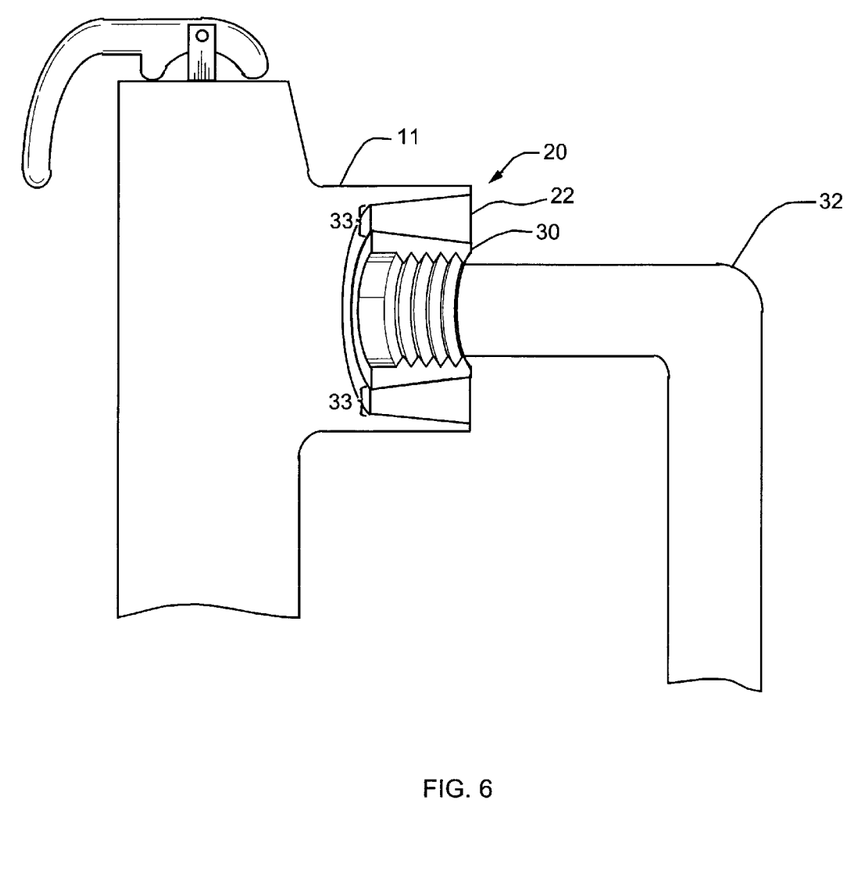
FIG. 6 is a side view of another embodiment of the present invention.

In a preferred embodiment, the bushing 20, FIG. 6, is a two-part device that includes a body portion 22 and separate engagement portion 30. This embodiment is particularly useful when the bushing 20 is coupled to a drain line 32 that is hard plumbed and will not easily disengage from the relief valve 11 such as when discharge pipe 32 passes through or is attached or bracketed to a wall or the like. The drain line 32 would be threaded into the engagement portion 30.

In the event that the drain line 32 becomes plugged, the body portion 22 will release from the outlet 14 and the engagement portion 30, thus allowing the relief valve 11 to function properly. Without a separate body portion 22 and engagement portion 30, a hard plumbed drain line 32 could prevent the bushing 20 from disengaging. In this embodiment, the cross-sectional area 33 formed by one end of body portion 22 would be sized to provide enough area to meet applicable state or local codes.

Figure 7:
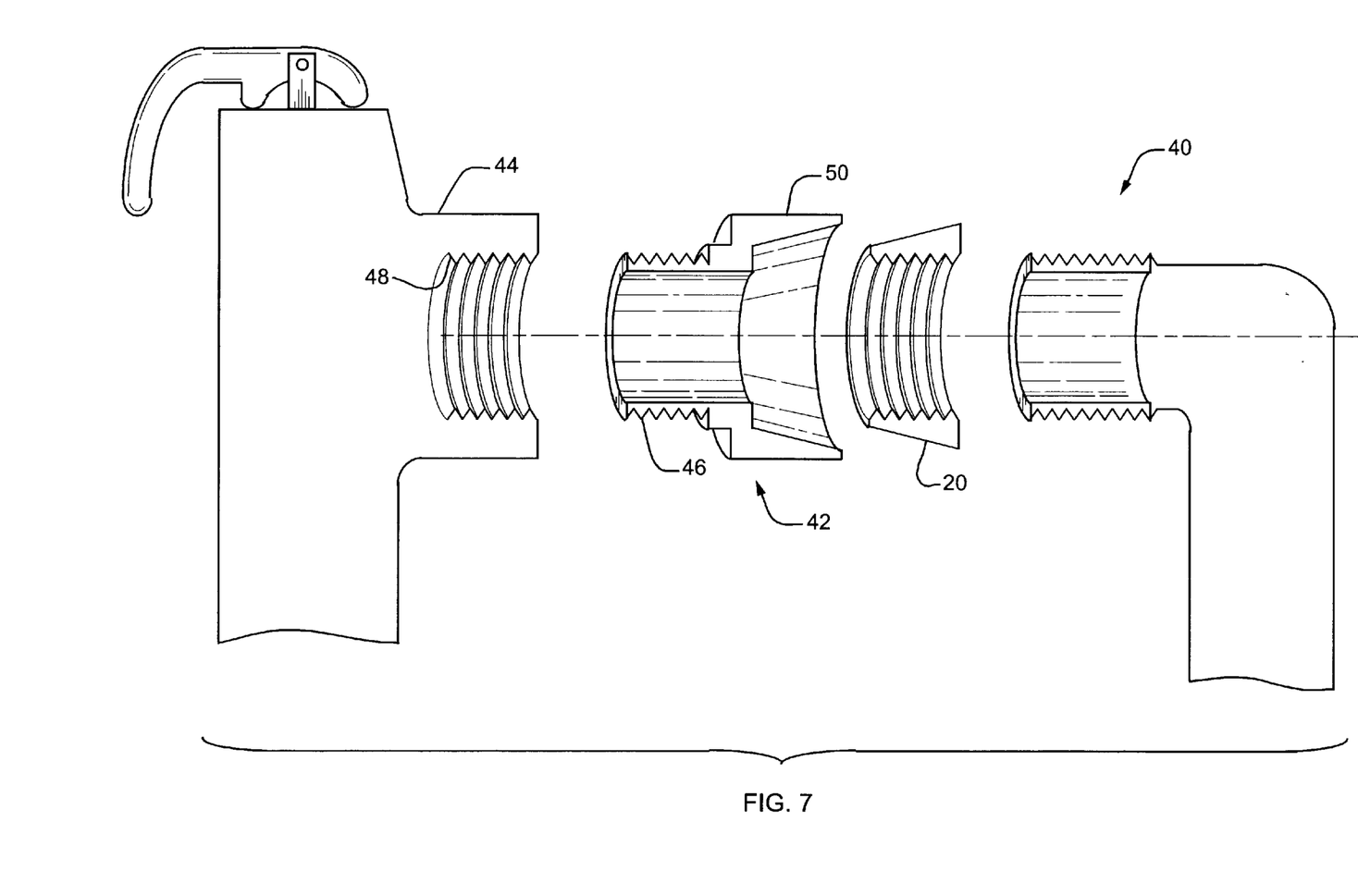
FIG. 7 is an exploded view of one embodiment of the present invention with an existing relief valve.

In yet another embodiment, a retrofit system 40, FIG. 7, may include a bushing 20, which may be any one of the above-described embodiments, and a bushing adapter 42. The adapter 42 is adapted to be threaded within an existing relief valve 44 and has an engagement region 46, typically IPS threads, that engages the outlet threads 48 of the relief valve 44. The adapter 42 also includes a bushing engagement region 50 that receives a bushing 20 and is sized to ensure that the system 40 complies with local regulations.

Figure 8:
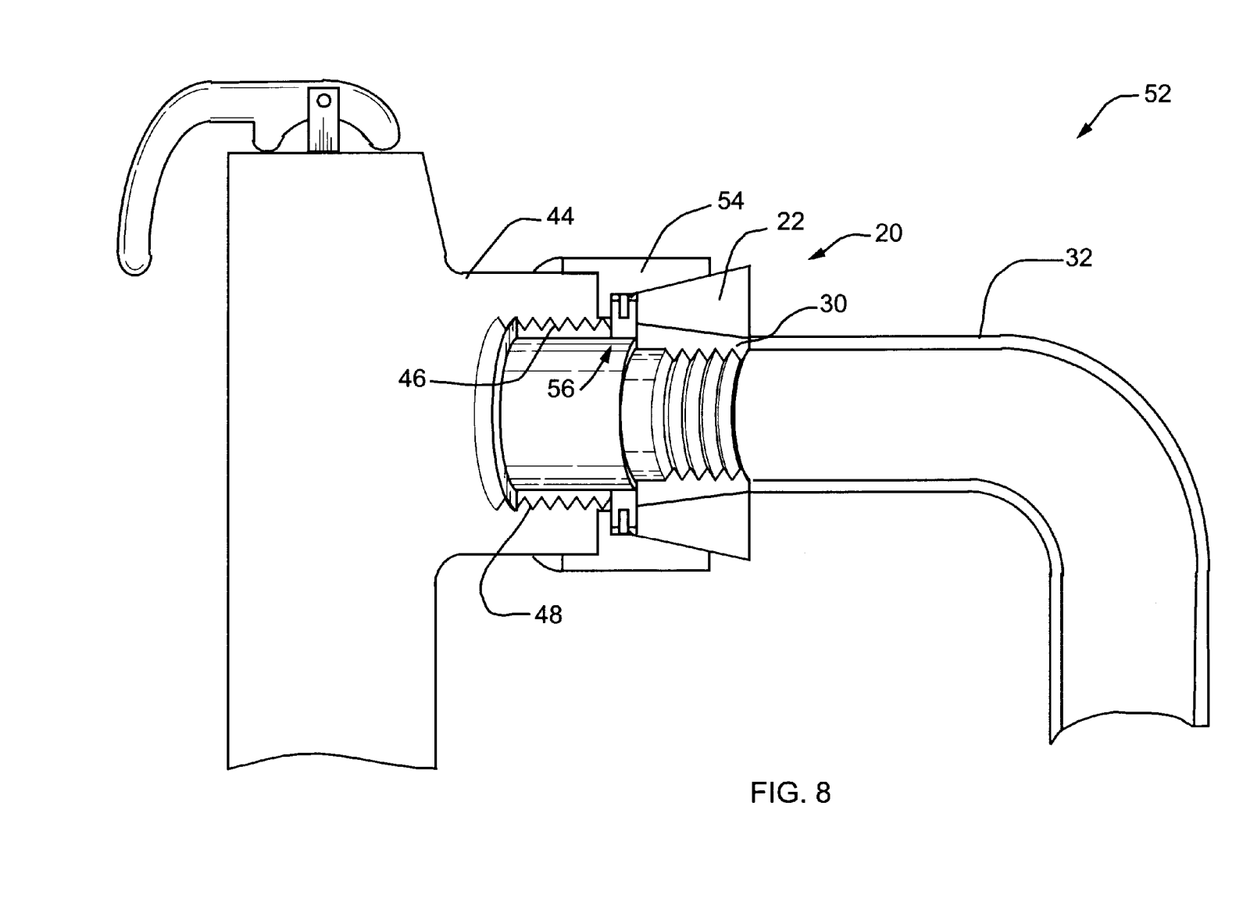
FIG. 8 is another embodiment of the present invention.

In a further embodiment of a retrofit system 52, FIG. 8, there is provided a bushing 20, which may be any one of the above-described embodiments, a bushing engagement portion 54, and an adapter portion 56. The adapter portion 56 is sized to fit within an existing relief valve 44 and includes an engagement region 46, typically IPS threads, that engages the outlet threads 48 of the relief valve 44.

Figure 9:
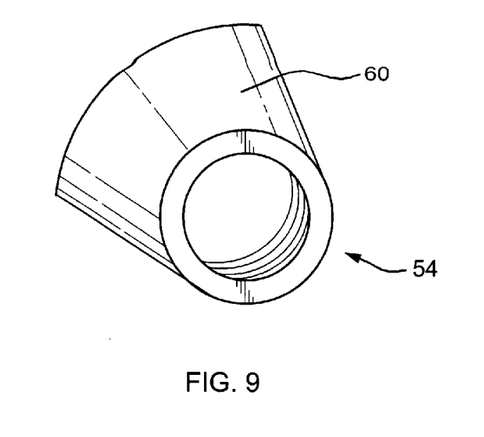
FIG. 9 is a plan view of one embodiment of a bushing engagement portion of the present invention having a smooth outer surface.
Figure 10:
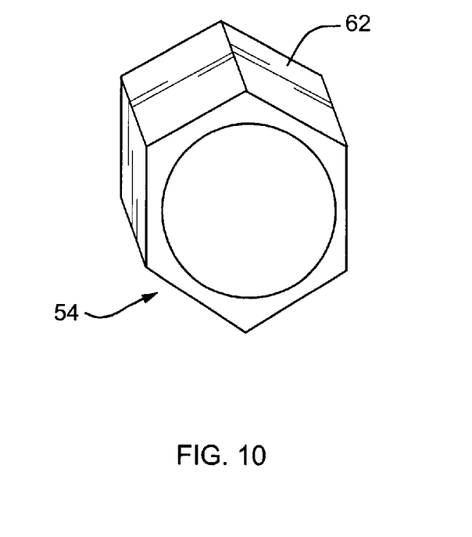
FIG. 10 is a plan view of one embodiment of a bushing engagement portion of the present invention having a multi-sided outer surface.

The bushing engagement portion 54 is sized to ensure that the system 40 complies with local regulations and is held in place by the adapter portion 56. The bushing engagement portion 54 can have a smooth outer surface 60, FIG. 9, to further prevent homeowners from tampering with the system 52 or a multi-sided surface 62, FIG. 10.

Figure 11:
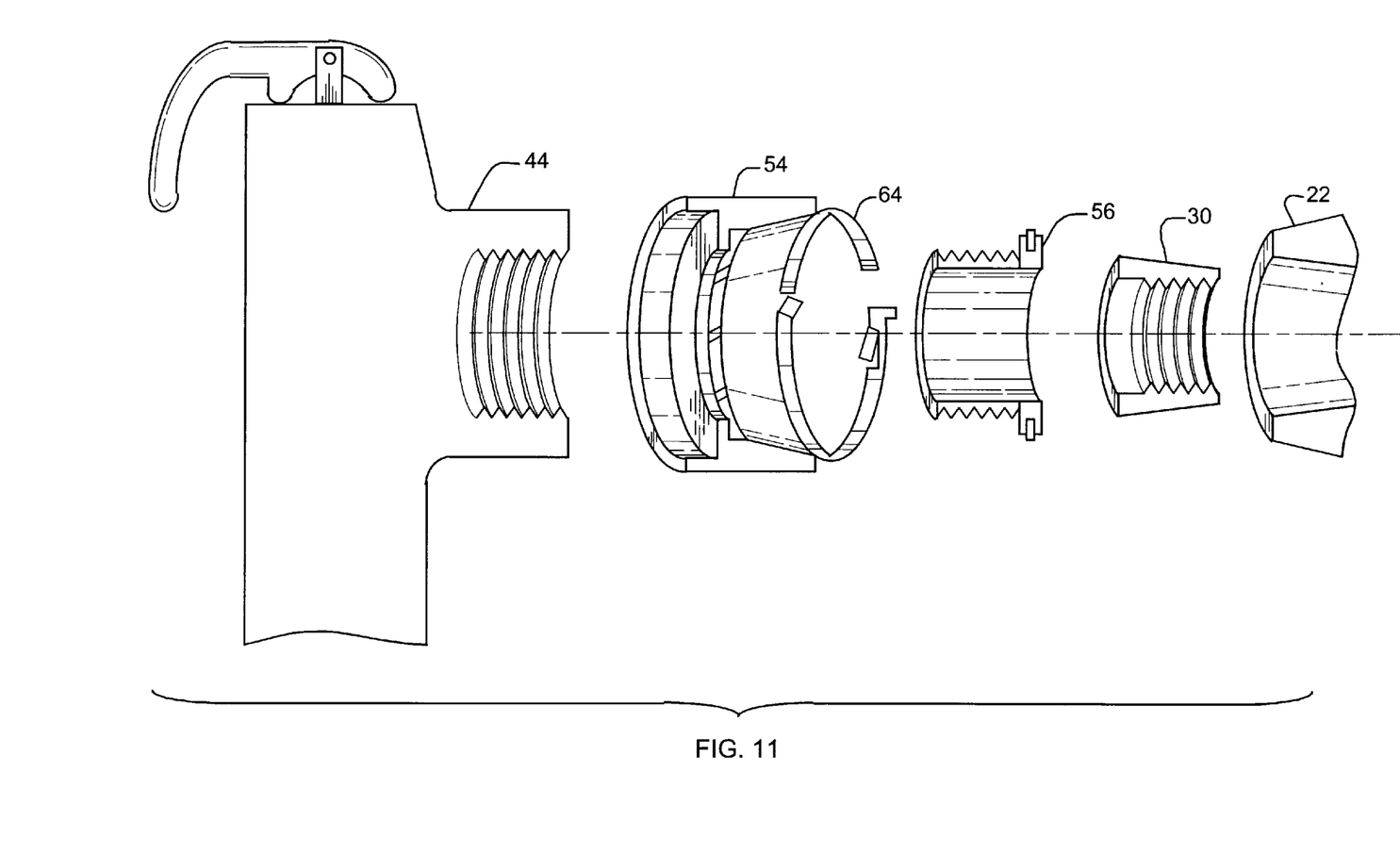
FIG. 11 is an exploded view of one embodiment of the present invention including a tamper-proof device.

In a preferred embodiment, the system 52 further includes a tamper-proof element 64, FIG. 11, including, for example, but not limited to, a crush ring/pin or a locking ring, to prevent homeowners from removing the bushing engagement portion 54 to plug the relief valve 44.

Figure 12:
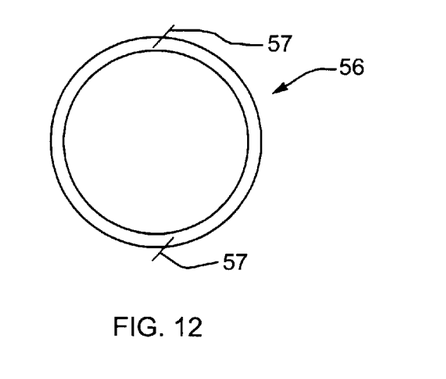
FIG. 12 is a perspective view of one embodiment of the present invention assembled having a discharge line.
Figure 13:
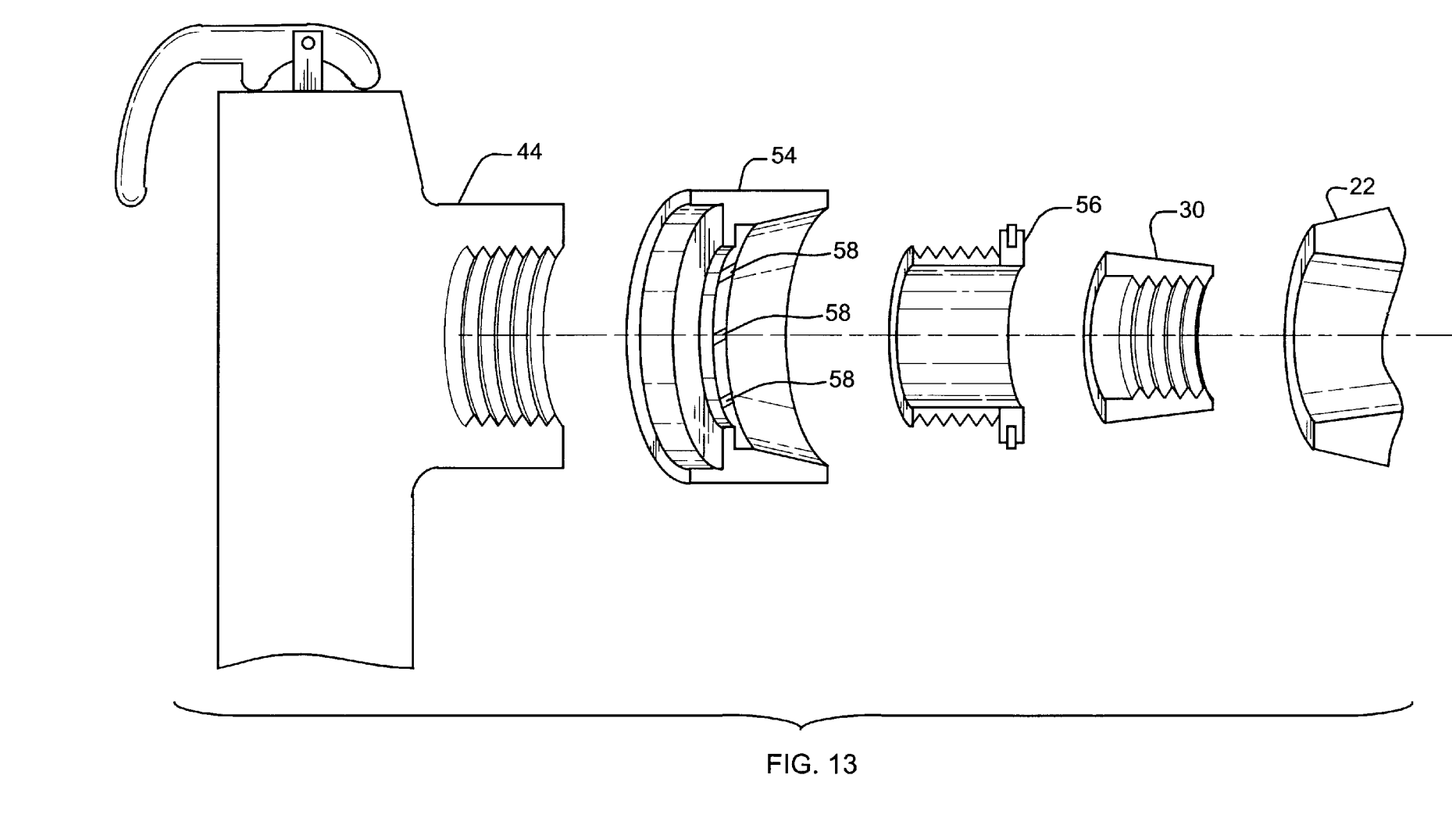
FIG. 13 is an exploded view of another embodiment of the present invention including a bushing engagement portion having one or more notches.

In yet another embodiment, the system 52, FIG. 12 may further include an adapter portion 56 having one or more tabs 57, and a bushing engagement portion 54, FIG. 13, having one or more notches 58. During installation, the installer rotates the bushing engagement portion 54 wherein the tabs 57 on the adapter portion 56 engage the notches 58 on the bushing engagement portion 54, thereby allowing the bushing adapter 56 to be screwed into the existing relief valve 44.

In one embodiment, the tabs 57 are designed to bend or break at a predetermined torque, preventing the bushing from being removed from the valve. This allows the installer to torque the adapter portion 56 to the proper specification while at the same time preventing someone from removing the system 52. In another embodiment, the tabs 57 engage the notches 58 in a ratchet motion wherein the adapter portion 56 can only be rotated in one direction. Alternatively, the tabs 57 and the notches 58 may be located on the bushing engagement portion 54 and the adapter portion 56 respectively without departing from the present invention.

Figure 14:
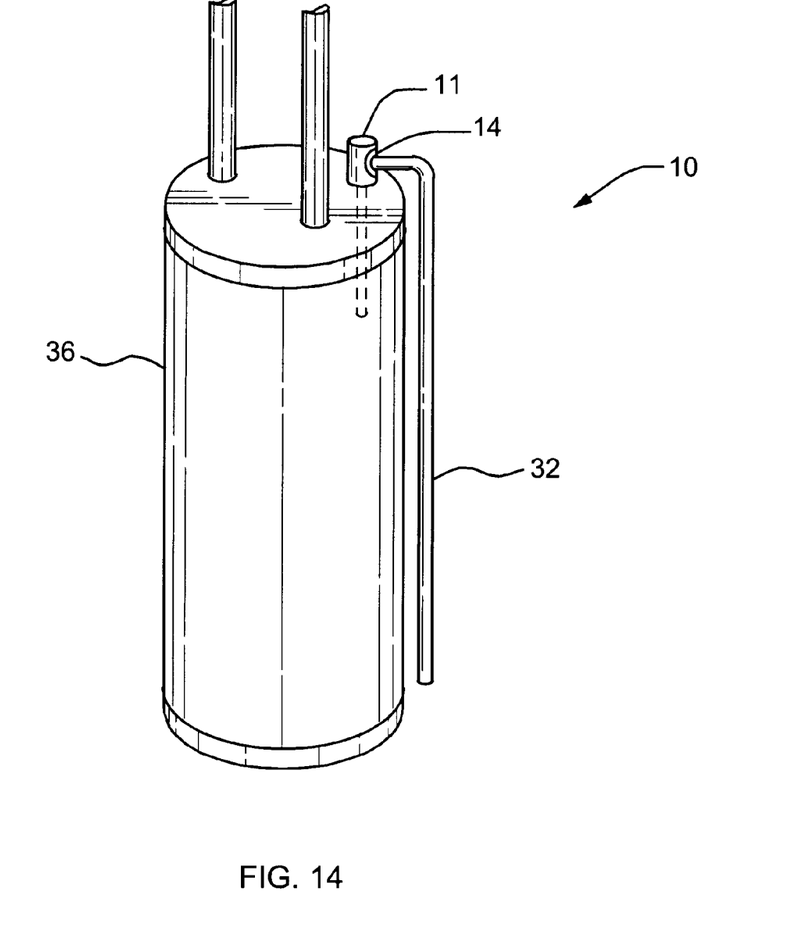
FIG. 14 is a plane view of a fluid safety discharge system in accordance with the present invention installed, as disclosed in one embodiment, on a hot water tank.

When an unsafe condition exists in the tank or other attached device 36, FIG. 14, the relief valve 11 opens thus mitigating the condition. When the pressure on the outlet 14 of the relief valve 11 reaches a predetermined point, the bushing 20 disengages the outlet 14 of the relief valve 11 thereby allowing the fluid to escape. Bushing 20 will prevent the unsafe blocking of the relief valve outlet by insuring that even if the outlet is plugged or blocked, the bushing 20 will be pushed out of the valve outlet.

Modifications and substitutions by one of ordinary skill in the art are considered to be within the scope of the present invention, which is not to be limited except by the following claims.

The invention claimed is:

1. A fluid safety discharge system comprising:
   a relief valve comprising:
     an inlet; and
     an outlet having a dimension; and
   a bushing comprising:
     a body having an external dimension sized to frictionally engage said outlet of said relief valve and having an internally threaded region for engaging with a threaded device, wherein said bushing is adapted to disengage from said relief valve at a predetermined pressure allowing said relief valve to function as intended.

2. The fluid safety discharge system as claimed in claim 1 wherein said threaded device is a pipe thread bearing device.

3. The fluid safety discharge system as claimed in 1 wherein said body is a material selected from the group consisting of synthetics, metal, and composite.

4. The fluid safety discharge system as claimed in claim 1 wherein said bushing further comprises a gripping region on one end of said bushing.

5. The fluid safety discharge system as claimed in claim 1 wherein said bushing is tapered.

6. The fluid safety discharge system as claimed in claim 1 wherein said bushing further includes annular high and low regions on an exterior surface of said bushing.

7. The fluid safety discharge system as claimed in claim 1 wherein said bushing further includes longitudinal high and low regions on an exterior surface of said bushing.

8. The fluid safety discharge system as claimed in claim 1 further comprising a discharge tube attached to said bushing.

9. A fluid safety discharge system comprising:
a relief valve comprising:
an inlet; and
an outlet having a dimension; and
a two-piece bushing comprising:
an engagement portion having an internally threaded region for engaging with a threaded device; and
a body portion having an external dimension sized to frictionally engage said relief valve outlet and an internal dimension sized to frictionally engage said engagement portion, wherein said body portion is adapted to disengage from said relief valve outlet and from said engagement portion at a predetermined pressure allowing said relief valve to function as intended.

10. The fluid safety discharge system as claimed in claim 9 wherein said body portion includes a gripping region.

11. The fluid safety discharge system as claimed in claim 9 wherein said body portion is tapered.

12. The fluid safety discharge system as claimed in claim 9 wherein said body portion further includes annular high and low regions on an exterior surface of said body portion.

13. The fluid safety discharge system as claimed in claim 9 wherein said body portion further includes longitudinal high and low regions on an exterior surface of said body portion.

14. The fluid safety discharge system as claimed in claim 9 wherein said engagement portion is tapered.

15. The fluid safety discharge system as claimed in claim 9 further comprising a discharge tube attached to said bushing.

16. A system for connecting a fluid safety discharge system to an existing relief valve having an inlet and an outlet having an internally threaded region, said system comprising:
an adapter comprising:
a relief valve engagement region for threadably engaging said internally threaded region of said relief valve; and
a bushing engagement region; and
a bushing comprising:
a body having an external dimension sized to frictionally engage said bushing engagement region of said adapter and a threaded section having an internally threaded region for engaging a threaded device, wherein said bushing is adapted to disengage from said bushing engagement region of said adapter at a predetermined pressure allowing said relief valve to function as intended.

17. The system as claimed in claim 16 wherein said relief valve engagement region and said bushing engagement region are separate.

18. The system as claimed in claim 16 further comprising a tamper-proof device for preventing a user from disabling said system, said tamper-proof device positioned between said bushing engagement region and said relief valve engagement region.

19. The system as claimed in claim 18 wherein said tamper-proof device is a locking ring.

20. The system as claimed in claim 18 wherein said relief valve engagement region further includes at least one tab and said bushing engagement region further includes at least one notch.

21. A system for connecting a fluid safety discharge system to an existing relief valve having a an inlet and an outlet having an internally threaded region, said system comprising:
an adapter comprising:
a relief valve engagement region for threadably engaging said internally threaded region of said relief valve; and
a separate bushing engagement region; and
a bushing comprising:
a body having an external dimension sized to frictionally engage said bushing engagement region of said adapter and a threaded section having an internally threaded region for engaging a threaded device, wherein said bushing is adapted to disengage from said relief valve outlet at a predetermined pressure allowing said relief valve to function as intended.

22. The system as claimed in claim 21 further comprising a tamper-proof device for preventing a user from disabling said system, said tamper-proof device positioned between said bushing engagement region and said relief valve engagement region.

23. The system as claimed in claim 22 wherein said relief valve engagement region further includes at least one tab and said bushing engagement region further includes at least one notch.

24. The system as claimed in claim 22 wherein said tamper-proof device is a locking ring.

* * * * *